Patented Aug. 13, 1940

2,211,710

UNITED STATES PATENT OFFICE 2,211,710

DIAZINE-ALDEHYDE RESINOUS CONDENSATION PRODUCTS

Werner Zerweck and Karl Keller, Frankfort-on-the-Main-Fechenheim, Germany, assignors to I. G. Farbenindustrie Aktiengesellschaft, Frankfort-on-the-Main, Germany No Drawing. Application September 24, 1938, Serial No. 231,561. In Germany June 24, 1936

4 Claims. (Cl. 260—72)

Our U. S. application Serial No. 124,034, filed February 4, 1937, relates to resinous condensation products and process of making same.

Our present invention is a continuation in part of the said application and relates to resinous condensation products and process of making same more particularly to those obtained by condensing a low aliphatic aldehyde containing a chain of at the most 4 carbon atoms, particularly formaldehyde or other compounds splitting off aldehydes with compounds of the general formula:

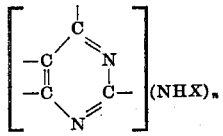

wherein $n$ is at least 2, X stands for a member of the group consisting of H and $NH_2$ and wherein to the carbon atoms, radicles of the group consisting of the aforesaid NHX-groups, hydrogen, alkyl, phenyl, phenylene, hydroxy, alkoxy, mercapto, thioether and substituted amino groups are attached.

As suitable compounds are to be named amino-, hydrazino- and aminohydrazino compounds of the pyrimidine, quinazoline and quinoxaline series which may contain further substituents of the aforesaid type.

One molecular weight of the above compound is treated with at least one molecular weight of the aldehyde. The condensation may be carried out in neutral, acid or alkaline condition, in the cold or in the hot and in organic or inorganic liquids or molten masses. Further on the condensation may be performed without additions of other substances and the condensation products thus obtained may be mixed with filling materials and dyestuffs, or the condensation may be carried out in the presence of fillers and dyestuffs. The condensation is accelerated by the addition of acids or acid-forming compounds, whereas it is retarded by the addition of alkalies and organic bases.

Beside the above compound there may be added to the condensation mixture other compounds which are capable of condensing with aldehydes such for example as urea, thiourea, substituted ureas, polymethylene-ureas, dicyandiamide, guanidine, sugars of all kinds, sulphonamides, mono- or polycarboxylic acid amides, aminobenzenes, phenols etc. However, the amount of the above compound employed should not be too small; it must be the main ingredient of the total quantity of the compounds which are capable of condensing with the aldehyde in order to give prominence to the valuable properties of the above condensation product. The resins thus obtained may be employed in admixture with other natural or artificial resins such for example as phenol, urea, aniline, alkyl and ketone resins.

The present condensation products are singularly valuable substances because they combine the good properties of electric insulation and high resistance to water of the known aniline-formaldehyde resins with the colorlessness and resistance to light of the urea resins. They may be heated to 200° and more without decomposition, they are very resistant even to boiling water and hot water vapour and they are colorless and stable to light. They are particularly suitable for the manufacture of moulded articles because in the hot moulding press they pass over quickly into their final state. They are therefore particularly adapted for the manufacture of gramophone records. Just as with the known hardening artificial resins the new products can be worked up with various kinds of fillers and dyestuffs, and they show great stability and resistance to heat and light, even when employed with organic fillers. The finished moulded articles are distinguished by absence of scent and taste. For being employed for electrical engineering they have the advantage of a very good insulating power and other good electric properties, particularly a good resistance to surface leakage current. They are therefore especially adapted for the manufacture of objects of electric insulation and construction, which are often or for a long time exposed to temperatures of 100° and more, such as parts of switches, lamp-pedestals and lamp-shades, contacts of flatirons, bearing-dishes, particularly of boxes for wireless apparatus, moreover for the manufacture of vessels and utensils which are often or for a long time exposed to aqueous liquors, such as cups, bowls, cans, boxes, particularly for soap buttons, vases, domestic utensils of various kind, medical and sanitary articles, sets of teeth, coatings for tables and pieces of furniture and the like. Moreover they may be used as fire protecting agents, particularly when a sugar has been added during or after the condensation reaction.

When the new resins are employed as lacquers and impregnating agents, coatings resistant to water and light are formed in a short time with or without heating. Moreover the new resins are suitable for gluing and cementing of various articles.

In order to further illustrate our invention the following examples are given, the parts being by weight and all temperatures in degrees centigrade.

*Example 1*

12.5 parts of 2,4,6-triaminopyrimidine of the formula:

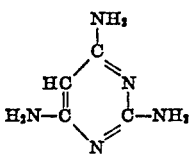

are dissolved in about 30 parts of formaldehyde of 30% strength. The solution is heated for some time and then evaporated at about 100°. By further heating hardening occurs. A transparent well lustrous water insoluble product is obtained.

*Example 2*

16 parts of 2.4-diaminoquinazoline of the formula:

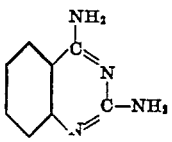

are dissolved at room temperature in 20 to 25 parts of formaldehyde of 30% strength. The dimethylol compound, which shortly separates in a crystalline state, is redissolved by shortly heating at about 100°. By further heating the reaction product separates as an almost colorless resin. The separation may be accelerated by the addition of a small amount of an acid. The resin thus obtained can be hardened with the formation of a very water-proof, not melting product. When retarding the separation of the intermediate by adding an inorganic or organic base such as pyridine to the solution and then evaporating the solution, after hardening a very lustrous condensation product particularly repelling water is obtained.

*Example 3*

15 parts of 2,4,5,6-tetraaminopyrimidine of the formula:

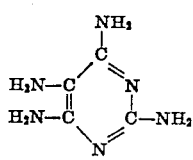

are dissolved by warming in about 40 parts of formaldehyde of 30% strength. The solution is held for some time at about 60°, then evaporated and the residual resin is heated for some hours at about 100 to 120° until hardening has occurred. The product thus obtained is very waterproof.

*Example 4*

16 parts of 6-hydroxy-2.4-diaminopyrimidine of the formula:

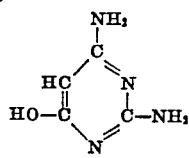

are finely powdered and intimately mixed with about 10 parts of paraformaldehyde. The powder obtained is exposed for some hours to a heating under pressure at about 100 to 120°. A hard and waterproof pressed product is obtained.

*Example 5*

25 parts of a condensation product (obtained by condensing cyandesoxybenzoine with guanidine) of the probable formula:

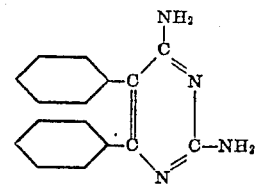

which forms white crystals melting at 220 to 221°, are dissolved in about 20 parts of water and 60 parts of formaldehyde of 30% strength while warming. Then the water is removed by evaporation and the residual soft resin is heated at 80 to 90° for some hours. In this manner a hard white condensation product is obtained, which is still soluble in boiling water. By heating it for a longer time at temperatures above 100° it is converted into the water insoluble state while splitting off formaldehyde.

When replacing the above diphenyldiaminopyrimidine by a corresponding amount of 6-phenyl-2.4-diamino-pyrimidine of the formula:

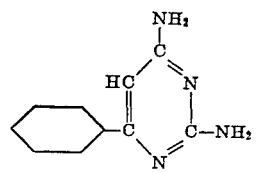

likewise a resinous hard condensation product is obtained which more rapidly is hardened and converted into the water-insoluble state.

*Example 6*

10 parts of 5,6-benzo-2,4-diamnoquinazoline of the formula:

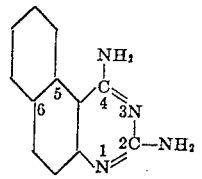

of 198° melting point obtainable for instance by acting at higher temperatures with alcoholic ammonia on 5,6-benzo-2,4-dichloroquinazoline (which latter compound may be prepared by the action of a mixture of phosphorus pentachloride and phosphorus oxychloride on 5,6-benzo-2,4-dioxoquinazoline) are mixed with an excess of a formaldehyde solution of 30% strength and 1 part of pyridine and the mixture is warmed at about 60 to 70° whereby rapidly a clear solution occurs. The solution is evaporated in vacuo and the residue is heated for some hours at 100 to 110° whereby a light water insoluble resin is formed.

*Example 7*

A mixture of 60 parts of 2,4,6-triaminopyrimidine, 95 parts of phenol, 250 parts of formaldehyde of 30% strength and 1 part of sodium hydroxide is heated at about 80° until the formation of resin occurs. Then the formed resin is milled with 200 parts of wood powder and dried. From such a molding mass articles of a good resistance towards light and water can be made.

Instead of the said quantity of formaldehyde one may use about 80 parts of acetaldehyde with the addition of the corresponding amount of water.

Example 8

A mixture of 60 parts of urea and about 200 parts of a neutralized formaldehyde solution of 30% strength is heated to boiling for about 3 hours. When cool 30 parts of 2,4,6-triaminopyrimidine and 80 parts of cellulose are added. After drying and comminuting a moulding powder is obtained which can be used for the manufacture of articles by means of pressure and heat, which articles exhibit a greater resistance to water than those prepared from resins obtained without the addition of triaminopyrimidine.

A similar product is obtained when replacing urea by the corresponding amount of thiourea.

Example 9

125 parts of 2,4,6-triaminopyrimidine, 130 parts of propylaldehyde and 100 parts of wood powder is mixed for about an hour at about 50° in a knead apparatus. After drying for about 2 hours at about 60°, advantageously in vacuo a valuable moulding mass is obtained.

One may replace the propylaldehyde by butyraldehyde.

Example 10

A mixture of 125 parts of 2,4,6-triaminopyrimidine, 100 parts of paraformaldehyde and about 800 parts of ethylalcohol or butylalcohol or lactic acid ethylester is heated to boiling. Thereby a clear resin solution is formed which is adapted for casting films advantageously with the addition of a softening agent such as camphor, butylphthalate, tricresylphosphate and the like. By pouring the resin solution into water a powder is obtained, which after being dried in the heat can be moulded to plates and the like.

Example 11

In a kneading apparatus, which is heated at about 50°, for about 2 hours 80 parts of 2,4,6-triaminopyrimidine are milled with 50 parts of glycerol, 150 parts of formaldehyde of 30% strength and 200 parts of cellulose. The formed homogeneous and moist mass is dried. By comminuting in a mill, in a given case with the addition of dyestuffs and melting agents a moulding powder is obtained, which can be rapidly transformed into hard and solid articles under pressure at temperatures ranging from 120 to 180°. Instead of glycerol other fillers such as starch, glucose, cane sugar and the like can be added.

Example 12

A mixture of 100 parts of 2,4,6-triaminopyrimidine, 15 parts of dicyandiamide, 50 parts of glucose, 1 part of sodium carbonate and 280 parts of formaldehyde of 30% strength is stirred while warm until total solution. With a such solution sheets of paper are impregnated, which after drying are pressed in the heat to plates.

Example 13

15 parts of 2-mercapto-4,6-diaminopyrimidine of the formula:

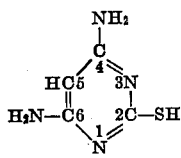

are stirred with a little amount of water while forming a thin pulp and then warmed with the addition of 60 parts of formaldehyde of 30% strength and about 3 to 5 parts of pyridine, until the mass has been dissolved. Then the water is distilled off and the residual resin is heated for some time at temperatures a little higher than 100°. In this manner a hard and very water-proof resin is obtained.

A similar product is obtained by starting from 2-hydroxy-4,6-diaminopyrimidine of the formula:

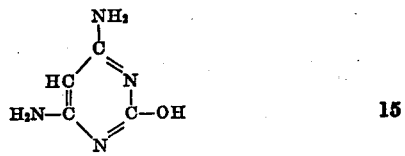

Example 14

When starting from 2-methylthio-4,6-diaminopyrimidine of the formula:

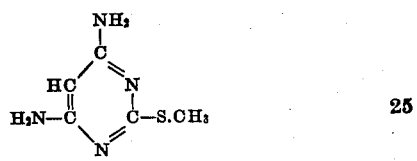

a resin is obtained which is very waterproof and particularly resistant to the action of alkaline liquors.

Example 15

32 parts of 2-cyanamino-4,6-diamino-pyrimidine of the formula:

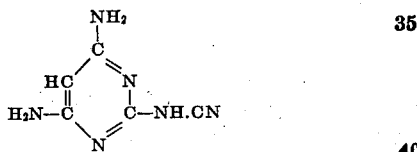

are stirred with a little amount of water and heated after the addition of about 100 parts of formaldehyde of 30% strength until a clear solution occurs. Then the solution is evaporated and the residue is hardened at about 120°. The resin thus obtained is very waterproof.

Example 16

17 parts of 2,6-dihydroxy-4,5-diamino-pyrimidine of the formula:

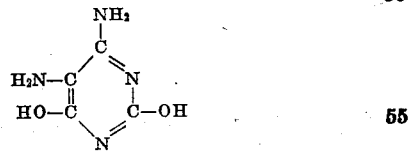

are mixed with some water, about 50 parts of formaldehyde of 30% strength and about 2 parts of pyridine and the mixture is boiled for some time. The water is distilled off and a resin is obtained which is hardened by heating at 100 to 120°. It is resistant towards boiling water.

Example 17

20 parts of 2-phenyl-4,6-diamino-pyrimidine of the formula:

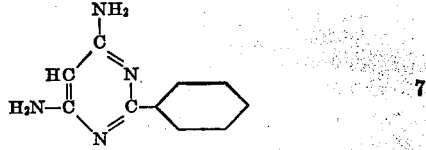

are heated at about 90° for some time after the addition of about 60 parts of formaldehyde of 30% strength. When solution has occurred it is held for 1 to 2 hours at 50 to 60° and then it is evaporated in vacuo. The residual resin is heated for some hours at about 100 to 105°. The formed product is a very solid mass which is resistant to heat, to water and to the action of acids and alkalies.

Example 18

A mixture of 60 parts of urea and 200 parts of a neutralized formaldehyde solution of 30% strength is heated to boiling for 3 hours. When cool 33 parts of 2-mercapto-4,6-diaminopyrimidine, 80 parts of cellulose and 1 part of pyridine are added. After drying and comminuting a moulding mass is obtained, from which by means of heat and pressure articles can be made which are more resistant towards water than those obtained without the addition of the pyrimidine compound.

Example 19

63 parts of 2-hydroxy-4,6-diaminopyrimidine are milled in a knead apparatus with 60 parts of propylaldehyde and 50 parts of wood powder for about an hour at 50 to 60°. The formed mass is intimately mixed with 100 parts of a commercial moulding powder based on urea resins, such as Pollopas. Articles obtained from such a mixture are essentially more resistant to water than the Pollopas articles themselves.

Example 20

In a kneading apparatus, which is heated at about 50°, for about 3 hours 50 parts of 2-methylthio-4,6-diaminopyrimidine are milled with 25 parts of glycerol, 100 parts of formaldehyde of 30% strength and 100 parts of cellulose. The formed homogeneous and moist mass is dried. By comminuting in a mill, in a given case with the addition of dyestuffs and melting agents a moulding powder is obtained, which can be rapidly transformed into hard and solid articles under pressure at temperatures ranging from 100 to 150°. Instead of glycerol other fillers such as starch, glucose, cane sugar and the like can be added.

Example 21

15 parts of 2,4,6-trihydrazido-pyrimidine of the formula:

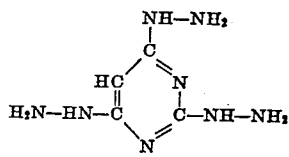

obtained by acting with hydrazine on 2,4,6-triamino-pyrimidine, are stirred with some water to a thin paste, then about 2 parts of pyridine and at 60 to 70° about 50 parts of formaldehyde of 30% strength are added and the mixture is heated until total solution. Then the solution is evaporated in vacuo and the residual resin is hardened at temperatures above 100°. A very waterproof and hard polymerization product is obtaind.

A similar resin is obtained when starting from 2,4-dihydrazidoquinazoline of the formula:

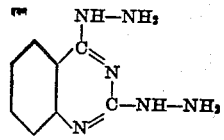

obtainable by acting with hydrazine on 2,4-dichloro-quinazoline.

Example 22

20 parts of 2-hydroxy-4,6-dihydrazido-pyrimidine of the formula:

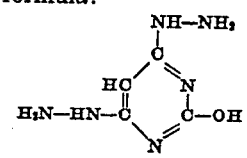

obtainable by acting with hydrazine hydrate on 2-hydroxy-4,6-diamino-pyrimidine are mixed with 2 to 3 parts of pyridine, about 25 parts of water and about 60 parts of formaldehyde of 30% strength are heated until the mass has been dissolved. The water is removed by evaporation and the residual resin is heated for some time at temperatures above 100°. A hard and very waterproof product is thus obtained.

Example 23

A mixture of 40 parts of aminohydrazinoquinazoline of the formula:

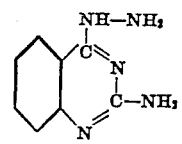

of 229 to 230° melting point, obtained by acting at 10 to 20° with concentrated ammonia on 2,4-dichloroquinazoline and subsequently decomposing at about 80–90° the formed monochloromonoaminoquinazoline of 235° melting point with hydrazine hydrate, 35 to 70 parts of formaldehyde of 40% strength, 10 to 15 parts of pyridine and a little quantity of water is heated for some time until solution occurs. The solution is evaporated in vacuo and the remaining resin is heated for some time at temperatures above 100°. According to the amount of the formaldehyde used and the temperature and duration of the heating process resins are obtained, which are to a more or less degree plastic in the heat. At room temperature they are hard and have a good resistance to water.

Example 24

A mixture of 15 parts of 2,4,6-trihydrazinopyrimidine, about 90 parts of water, 160 parts of alcohol and 22 parts of butyraldehyde is boiled under reflux, until solution occurs. Some impurities are removed by filtration and the filtrate is evaporated, whereby a pulverisable mass is obtained which is soluble in hot alcohol. When pouring the alcoholic solution on glass, metal or the like, after evaporation of the alcohol a transparent lacquer is obtained.

Example 25

10 parts of 5,6-benzo-2,4-dihydrazinoquinazoline of the formula:

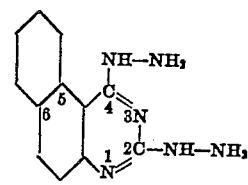

obtainable for instance by acting at higher temperatures with hydrazine hydrate on 5,6-benzo-2,4-dichloroquinazoline, are mixed with an excess of formaldehyde of 30% strength and 1 part of pyridine and the mixture is warmed at about 60 to 70°. Thereby rapidly a clear solution occurs. The solution is evaporated in vacuo and the residue is heated for some hours at 100 to 110°, whereby a light water insoluble resin is formed.

We claim:

1. Resinous condensation products obtained by condensing a low aliphatic aldehyde containing a chain of at the most 4 carbon atoms with a compound of the general formula:

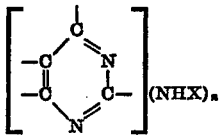

wherein $n$ is at least 2, X stands for a member of the group consisting of H and NH$_2$ and wherein to the carbon atoms, radicles of the group consisting of the aforesaid NHX-groups, hydrogen, alkyl, phenyl, phenylene, hydroxy, alkoxy, mercapto, thioether and substituted amino groups are attached.

2. A resinous condensation product obtained by condensing 2,4,6-triamino-pyrimidine of the formula:

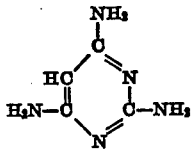

with formalehyde until the formation of the resin, which condensation product is transparent well lustrous and characetrized by good electric properties, resistance to water, heat and light, by colorlessness, which product is adapted for the use as lacquers, gluing agents and for the manufacture of pressed articles.

3. A resinous condensation product obtained by condensing 2,4-diamino-quinazoline of the formula:

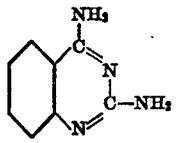

with formalehyde until the formation of the resin, which condensation product is a very lustrous product particularly repelling water and characterized by good electric properties, resistance to water, heat and light, by colorlessness, which product is adapted for the use as lacquers, gluing agents and for the manufacture of pressed articles.

4. A resinous condensation product obtained by condensing 2-mercapto-4,6-diamino-pyrimidine of the formula:

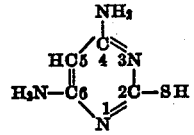

with formaldehyde until the formation of the resin, which condensation product is a hard and very waterproof resin and characterized by good electric properties, resistance to water, heat and light, by colorlessness, which product is adapted for the use as lacquers, gluing agents and for the manufacture of pressed articles.

WERNER ZERWECK.
KARL KELLER.